(12) United States Patent
Ishida et al.

(10) Patent No.: US 9,108,315 B2
(45) Date of Patent: Aug. 18, 2015

(54) ROBOT CONTROL SYSTEM AND ROBOT CONTROL METHOD

(75) Inventors: Daisuke Ishida, Kitakyushu (JP);
Hikaru Inoue, Kitakyushu (JP);
Shinichi Maehara, Kitakyushu (JP);
Kanji Takanishi, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 817 days.

(21) Appl. No.: 13/316,562

(22) Filed: Dec. 12, 2011

(65) Prior Publication Data

US 2013/0046408 A1 Feb. 21, 2013

(30) Foreign Application Priority Data

Aug. 16, 2011 (JP) ................. 2011-177897

(51) Int. Cl.
*G05B 19/418* (2006.01)
*B25J 9/16* (2006.01)
*B25J 5/02* (2006.01)
*B25J 9/00* (2006.01)

(52) U.S. Cl.
CPC ...... *B25J 9/1682* (2013.01); *B25J 5/02* (2013.01); *B25J 9/0087* (2013.01)

(58) Field of Classification Search
CPC ...... B25J 9/1682; B25J 9/1666; B25J 9/1676; G05B 19/41815; G05B 2219/36503
USPC ................. 700/247, 248, 251, 255
See application file for complete search history.

(56) References Cited

U.S. PATENT DOCUMENTS

| 4,482,968 | A | * | 11/1984 | Inaba et al. | ............ | 318/568.22 |
| 2008/0133056 | A1 | | 6/2008 | Nishihara | | |
| 2008/0243304 | A1 | * | 10/2008 | Yoshimi | ...................... | 700/245 |
| 2009/0091286 | A1 | | 4/2009 | Nihei et al. | | |

FOREIGN PATENT DOCUMENTS

| JP | 11-347983 | 12/1999 |
| JP | 2005-046966 | 2/2005 |
| JP | 2007-035792 | 2/2007 |
| JP | 2007-319962 | 12/2007 |
| JP | 2009-090403 | 4/2009 |
| KR | 1020090044130 | 5/2009 |

OTHER PUBLICATIONS

Extended European Search Report for corresponding EP Application No. 12156107.0-1239, Jun. 1, 2012.

(Continued)

*Primary Examiner* — Thomas G Black
*Assistant Examiner* — Peter D Nolan
(74) *Attorney, Agent, or Firm* — Mori & Ward, LLP (57) ABSTRACT

A robot control system according to an aspect of an embodiment includes a plurality of robots, at least one external axis, and converters. The robots perform axis behaviors. The external axes are a movable axis shared by the robots and are mutually connected to the robots. Each of the converters assumes a virtual robot formed by connecting all the external axes to the one robot and converts acquisition values on positions of the robot and the external axes acquired for the virtual robot into conversion values indicating absolute positions in a predetermined normal coordinate system.

9 Claims, 6 Drawing Sheets

(56) References Cited

OTHER PUBLICATIONS

Chanhun Park et al., Dual Arm Robot Manipulator and Its Easy Teaching System, 2009. IEEE International Symposium on Assembly and Manufacturing, Nov. 17, 2009, p. 242-247, XP031598708.
Kimberly Farrell et al., Modeling Dual-Arm Coordination for Posture: An Optimization-Based Approach, Jan. 1, 2005, XP55027583, URL: http://www.loomingsuspicions.com/docs/dual-arm.pdf.

Chinese Office Action for corresponding CN Application No. 201210035411.5, Jul. 18, 2014.
Japanese Office Action for corresponding JP Application No. 2011-177897, Jul. 16, 2013.
Chinese Office Action for corresponding CN Application No. 201210035411.5, Mar. 9, 2015.

* cited by examiner

| ENCODER | SERVO CONTROL BOARD 210c-1 | VIRTUAL ROBOT CONVERSION UNIT 210a-1 | SERVO CONTROL BOARD 210c-2 | VIRTUAL ROBOT CONVERSION UNIT 210a-2 |
|---|---|---|---|---|
| enR1 | ○ | ○ | | |
| enR2 | | | ○ | ○ |
| enR3 | ○ | ○ | | ○ |
| enR4 | | ○ | ○ | ○ |

○: CONNECTED

ROBOT CONTROL SYSTEM AND ROBOT CONTROL METHOD

CROSS-REFERENCE TO RELATED APPLICATION

This application is based upon and claims the benefit of priority of the prior Japanese Patent Application No. 2011-177897, filed on Aug. 16, 2011, the entire contents of which are incorporated herein by reference.

FIELD

The embodiment discussed herein is directed to a robot control system and a robot control method.

BACKGROUND

A conventional robot control system that controls a multi-axis robot has been known. The robot control system performs interference prevention control by which a multi-axis robot prevents interfering with surrounding obstacles on the basis of axis position information detected by a position detector such as an encoder. The robot control system has been known as disclosed in, for example, Japanese Laid-open Patent Publication No. 2009-90403.

A two-arm robot that has one body and a pair of multi-axis robots acting as two arms has further been known. In the case of the two-arm robot, the robot control system performs interference prevention control on the basis of individual position detection for each arm, that is to say, for each multi-axis robot.

When the body of the two-arm robot is not fixed to a fixed surface such as a floor but is fixed to movable external axes such as pivot axes or travelling axes, the robot control system performs individual interference prevention control on the external axes.

However, because the conventional robot control system performs individual interference prevention control on multi-axis robots and external axes as described above, the robot control system has a problem in that the overall process of the system is easily complicated.

A behavior of a multi-axis robot normally requires certainty. Therefore, it is preferable to avoid complication that has an influence on the whole system in order to guarantee the certainty.

The problem is also caused due to the entire control of robots that are connected to each other, in addition to the interference prevention control of a two-arm robot.

SUMMARY

A robot control system according to an aspect of an embodiment includes a plurality of robots, at least one external axis, and converters. The robots perform axis behaviors. The external axis is a movable axis that is shared by the robots and connects the robots each other. Each of the converters assumes a virtual robot formed by connecting all external axes to one robot and converts acquisition values for positions of the robot and the external axes acquired for the virtual robot into conversion values indicating absolute positions in a predetermined normal coordinate system.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF EMBODIMENT

Hereinafter, a robot control system and a robot control method according to an embodiment of the present disclosure will be described in detail. In addition, the embodiment disclosed below is not intended to limit the present invention.

Figure 1:
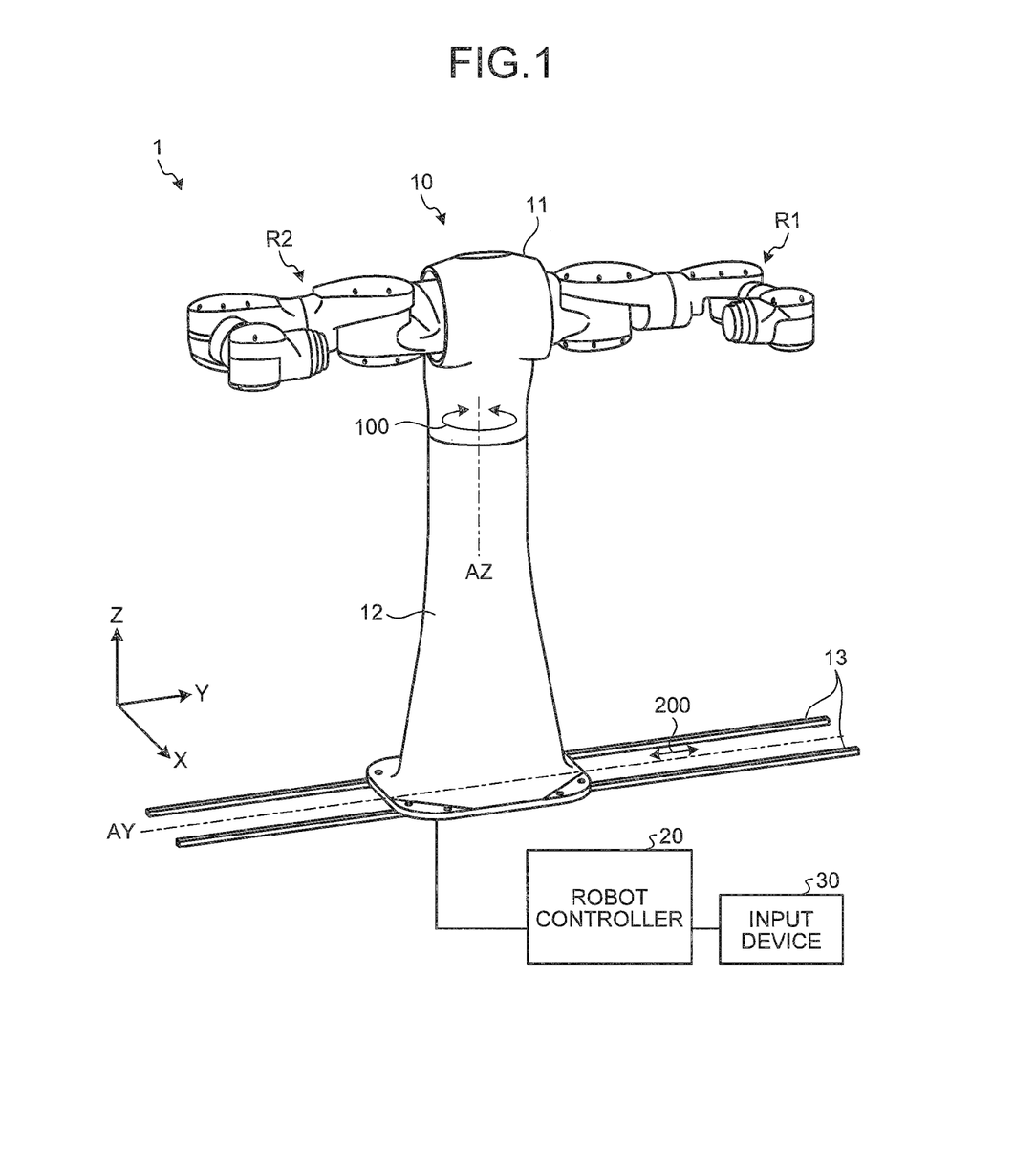
FIG. 1 is a diagram illustrating a configuration example of a robot control system according to an embodiment.

FIG. 1 is a diagram illustrating a configuration example of a robot control system 1 according to the embodiment. In order to make an explanation understandable, a three-dimensional rectangular coordinate system that includes Z-axis of which the positive direction is a vertically upward direction is illustrated in FIG. 1. The rectangular coordinate system can be employed in other drawings that are used for the following explanations.

As illustrated in FIG. 1, the robot control system 1 includes a robot 10, a robot controller 20, and an input device 30.

The robot 10 includes a robot R1, a robot R2, a body 11, and a base 12. Herein, as illustrated in FIG. 1, the robot 10 is a so-called two-arm robot that includes the robot R1 and the robot R2 as two arms.

The robot R1 and the robot R2 are multi-axis robots (seven-axis robots in FIG. 1) and have end effectors (not illustrated) provided in both terminated movable parts.

As illustrated in FIG. 1, the body 11 supports the robot R1 and the robot R2. Moreover, the base 12 supports the body 11 in such a manner that the body 11 can revolve around a pivot axis AZ (see a double-headed arrow 100 of FIG. 1). Furthermore, the base 12 is placed on a rail part 13.

The base 12 includes a not-illustrated traveling mechanism and travels on the placed rail part 13 along a travelling axis AY (see a double-headed arrow 200 of FIG. 1). Herein, the pivot axis AZ and the travelling axis AY may be external axes that are shared by the robot R1 and the robot R2.

The robot controller 20 is a controller that performs the entire control of the robot 10. Hereinafter, it will be explained that the robot controller 20 mainly performs interference prevention control. Moreover, a configuration example of the robot controller 20 is described below with reference to FIG. 3.

The robot controller 20 is connected to the robot 10 via a communication network such as a wired LAN (Local Area Network) or a wireless LAN.

The input device 30 is a device that receives an operation from an operator. The input device 30 is further connected to the robot controller 20 via a communication network such as a wired LAN or a wireless LAN. The operator performs teaching on the robot 10 and sets an operating area of the robot 10 via the input device 30.

Figure 6A:
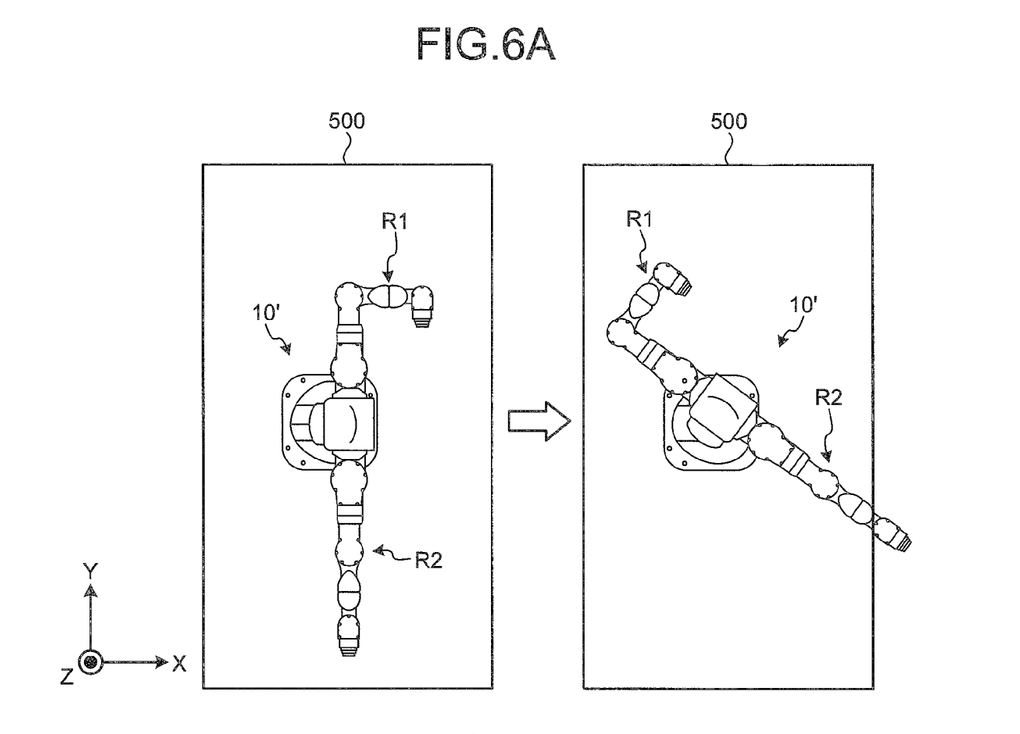
FIG. 6A is a diagram illustrating the brief of a general interference prevention control technique.
Figure 6B:
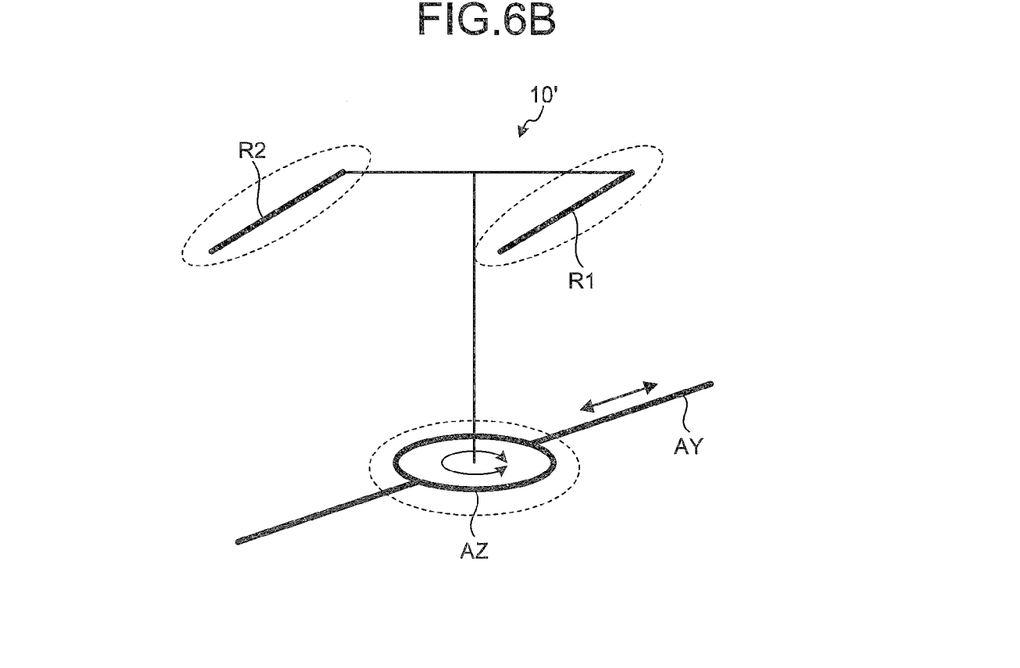
FIG. 6B is a pattern diagram illustrating axes used in a conventional interference prevention control technique.

Herein, an interference prevention control technique will be explained with reference to FIGS. 6A and 6B. FIG. 6A is a diagram illustrating the brief of a general interference prevention control technique. FIG. 6B is a pattern diagram illustrating axes used in a conventional interference prevention control technique.

A robot 10' illustrated in FIGS. 6A and 6B has the same axis configuration as that of the robot 10 of the robot control system 1 according to the embodiment.

In FIG. 6A, a situation before a behavior of the robot 10' is illustrated on the left side of a page space and a situation after the behavior of the robot 10' is illustrated on the right side of the page space. It is assumed that the robot 10' is in a predetermined operating area 500 before the behavior.

As illustrated in FIG. 6A, when a movement directive is given to the robot 10', the general interference prevention control technique determines whether the robot R1 or the robot R2 goes out of the operating area 500 in response to the movement directive.

Herein, when it is determined that the robot R1 or the robot R2 goes out of the operating area 500 as illustrated in the right side of the page space of FIG. 6A, the movement directive is additionally modified in such a manner that the robot R1 or the robot R2 enters the operating area 500, for example. Hereinafter, such a process is referred to as a "preliminary check process" for the movement directive.

In consideration of a time lag and an error of the movement directive, it is determined whether the robot R1 and the robot R2 after the behavior are within the operating area 500. Such a determination is performed on the basis of actual measurement values measured by position detectors such as encoders included in the robot R1 and the robot R2. Hereinafter, such a process is referred to as a "subsequent check process" for the movement directive.

Meanwhile, as illustrated in FIG. 6B, the conventional interference prevention control technique acquires the positions of the robot R1 and the robot R2 of the robot 10' by using separate coordinate systems.

Similarly, the positions (specifically, rotation angles etc.) of the pivot axis AZ illustrated in FIG. 1 are also acquired by using separate coordinate systems.

Parts surrounded by closed dotted curves of FIG. 6B indicate that the positions of the robot R1, the robot R2, and the pivot axis AZ are individually acquired. Although it is not illustrated, this point is similarly applied to the travelling axis AY.

Therefore, the conventional interference prevention control technique is difficult to grasp mutual positions of the robot R1, the robot R2, and the pivot axis AZ. In other words, because an interference prevention control process is easily complicated, an operator who performs teaching on the robot 10' requires a high skill, for example.

Therefore, it is assumed that the robot control system 1 according to the embodiment acquires the positions of the robot R1, the robot R2, and the external axes shared by these robots by using a predetermined common normal coordinate system.

Figure 2A:
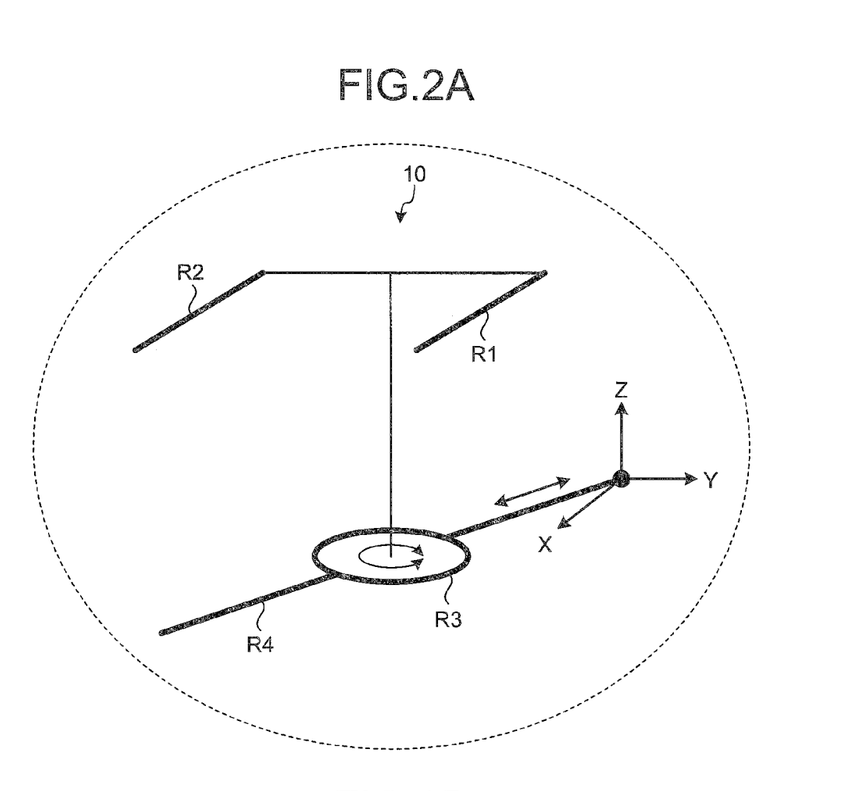
FIG. 2A is a pattern diagram illustrating axes used in the robot control system according to the embodiment.
Figure 2B:
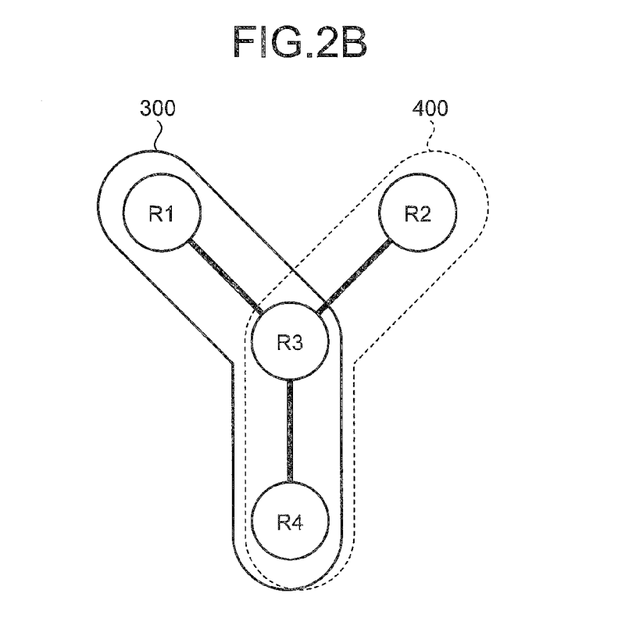
FIG. 2B is a diagram illustrating virtual robots assumed in the robot control system according to the embodiment.

The details of this point are explained with reference to FIGS. 2A and 2B. FIG. 2A is a pattern diagram illustrating axes used in the robot control system 1 according to the embodiment. FIG. 2B is a diagram illustrating virtual robots assumed in the robot control system 1 according to the embodiment.

As illustrated in FIG. 2A, it is assumed that the robot control system 1 according to the embodiment treats the pivot axis AZ and the travelling axis AY (see FIG. 1) that are external axes as a robot R3 and a robot R4 in addition to the robot R1 and the robot R2.

It is assumed that the positions of the robots R1 to R4 are acquired by using a predetermined common normal coordinate system. Herein, a part surrounded by a closed dotted curve of FIG. 2A indicates that the positions of the robots R1 to R4 are acquired by using, for example, a base coordinate system (see XYZ coordinates of FIG. 2A) of the robot R4 as a normal coordinate system.

Specifically, the robot control system 1 according to the embodiment assumes virtual robots of which each is formed by connecting all the external axes to one multi-axis robot in a row. For example, in the case of the robot R1, as illustrated by a part surrounded by a closed curve 300 of FIG. 2B, a virtual robot is formed by connecting the robot R3 and the robot R4 to the robot R1 in a row.

In the case of the robot R2, as illustrated by a part surrounded by a closed curve 400 of FIG. 2B, a virtual robot is formed by connecting the robot R3 and the robot R4 to the robot R2 in a row.

The robot control system 1 according to the embodiment acquires positions of axes (or, robots) that constitute each of the virtual robots. Then, the robot control system 1 converts acquisition values on the positions acquired for each virtual robot into conversion values that indicate absolute positions in the predetermined normal coordinate system.

At this time, the predetermined normal coordinate system employs a base coordinate system in which the robot R1 or the robot R2 is a start end and an external axis is positioned to its termination end in a row. In other words, because the robot R4 is positioned to the termination end in the example illustrated in FIG. 2B, the base coordinate system of the robot R4 is used as a normal coordinate system.

As a result, positions, in the predetermined normal coordinate system, of axes that constitute each virtual robot are shared by at least each the virtual robot. In other words, each of the robot R1 and the robot R2 can obtain position information of the robot R3 and the robot R4.

Then, the robot control system 1 according to the embodiment finally integrates position information for the virtual robots and grasps absolute positions of all the axes of the robot 10. In other words, because a complicated process caused by the control of separate coordinate systems can be avoided, a two-arm robot that has multi-axis robots connected to each other can be controlled easily and certainly.

It has been explained in the example described above that a base coordinate system in which an external axis is positioned to the termination end of a virtual robot is employed as a normal coordinate system. However, the normal coordinate system may be always fixed to a world coordinate system that is set on a ground surface or a working floor.

Figure 3:
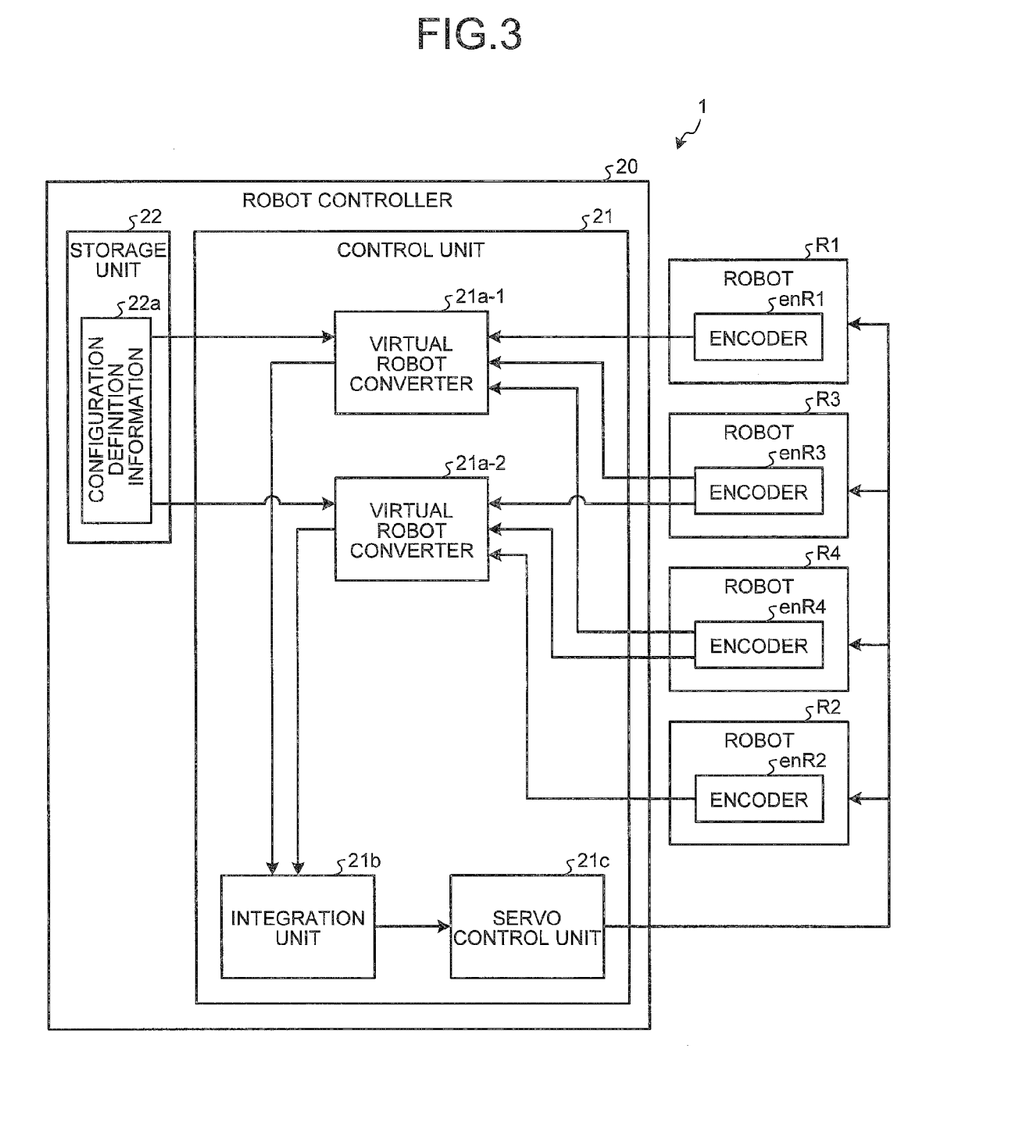
FIG. 3 is a block diagram illustrating the configuration of the robot control system according to the embodiment.

Next, a configuration example of the robot control system 1 according to the embodiment will be explained in detail with reference to FIG. 3. FIG. 3 is a block diagram illustrating the configuration of the robot control system 1 according to the embodiment.

Only components required for the explanation of the robot control system 1 are illustrated in FIG. 3 and thus the description on general components is omitted. Moreover, components illustrated in FIG. 3 are logical blocks that are abstracted on the basis of only their functions and the like. Therefore, the hardware configuration and the like of the robot control system 1 are not limited to this.

As illustrated in FIG. 3, the robot control system 1 includes the robots R1 to R4 and the robot controller 20. Herein, the description of the input device 30 illustrated in FIG. 1 is omitted.

The robot R1 includes an encoder enR1 that is a position detector. Similarly, the robot R2 includes an encoder enR2, the robot R3 includes an encoder enR3, and the robot R4 includes an encoder enR4.

Because the robot R1 and the robot R2 are multi-axis robots, each of the robot R1 and the robot R2 actually has encoders that correspond to axes of a multi-axis robot. However, only the encoder enR1 and the encoder enR2 that detect a predetermined representative position are illustrated herein.

The robot controller 20 includes a control unit 21 and a storage unit 22. The control unit 21 includes a virtual robot converter 21a-1 corresponding to the robot R1, a virtual robot converter 21a-2 corresponding to the robot R2, an integration unit 21b, and a servo control unit 21c. The storage unit 22 stores configuration definition information 22a.

The virtual robot converter 21a-1 is a processing unit that assumes a virtual robot formed by connecting the robot R3 and the robot R4 to the robot R1 and acquires the positions of the robot R1, the robot R3, and the robot R4 that are the axes of the virtual robot.

Specifically, the virtual robot converter 21a-1 acquires an output value of the encoder enR1 as an acquisition value indicating the position of the robot R1. Similarly, the virtual robot converter 21a-1 further acquires an output value of the encoder enR3 as an acquisition value indicating the position of the robot R3 and an output value of the encoder enR4 as an acquisition value indicating the position of the robot R4.

The virtual robot converter 21a-1 converts the acquisition values into conversion values that indicate absolute positions in the predetermined normal coordinate system. The conversion can use a so-called forward kinematics calculation. Then, the conversion values that are converted are output to the integration unit 21b to be described below.

The virtual robot converter 21a-1 determines a predetermined normal coordinate system and the like, with reference to definition information on the configuration of the virtual robot previously registered in the configuration definition information 22a of the storage unit 22. The definition information includes, for example, connection relation information that indicates which of the robot R1, the robot R3, and the robot R4 is positioned at a higher side.

The virtual robot converter 21a-1 together performs the subsequent check process for the movement directive on the basis of the conversion values.

The virtual robot converter 21a-2 is a processing unit that assumes a virtual robot formed by connecting the robot R3 and the robot R4 to the robot R2 and acquires the positions of the robot R2, the robot R3, and the robot R4 that are the axes of the virtual robot.

Because the process of the virtual robot converter 21a-2 is similar to the process of the virtual robot converter 21a-1 except that the robot R1 is replaced by the robot R2, the description is omitted herein.

Although it is illustrated in FIG. 3 that the number of virtual robot converters is two of the virtual robot converter 21a-1 and the virtual robot converter 21a-2, the number of virtual robot converters may be arbitrary in accordance with the number of virtual robots to be assumed.

The integration unit 21b is a processing unit that integrates the positions of all the axes of the robot 10 (see FIG. 1) in the predetermined normal coordinate system, on the basis of the conversion values that indicate the positions of the axes of the virtual robots input from the virtual robot converter 21a-1 and the virtual robot converter 21a-2.

The integration unit 21b together performs the preliminary check process for the movement directive on the basis of the integrated positions of the axes of the robot 10.

The integration unit 21b outputs a movement directive to the servo control unit 21c after performing the preliminary check process. The integration unit 21b can further monitor the movement directive to check interference of the robot R1 and the robot R2.

The servo control unit 21c is a processing unit that outputs a control signal for a servo (not illustrated) of each of the robots R1 to R4 to the servo on the basis of the movement directive input from the integration unit 21b.

Then, the servos drive the respective robots R1 to R4 on the basis of the respective control signals output from the servo control unit 21c.

The storage unit 22 is a storage device such as for example a nonvolatile memory and a hard disk drive and stores therein the configuration definition information 22a. Because the configuration definition information 22a is explained in detail, the description is omitted herein.

Figure 4A:
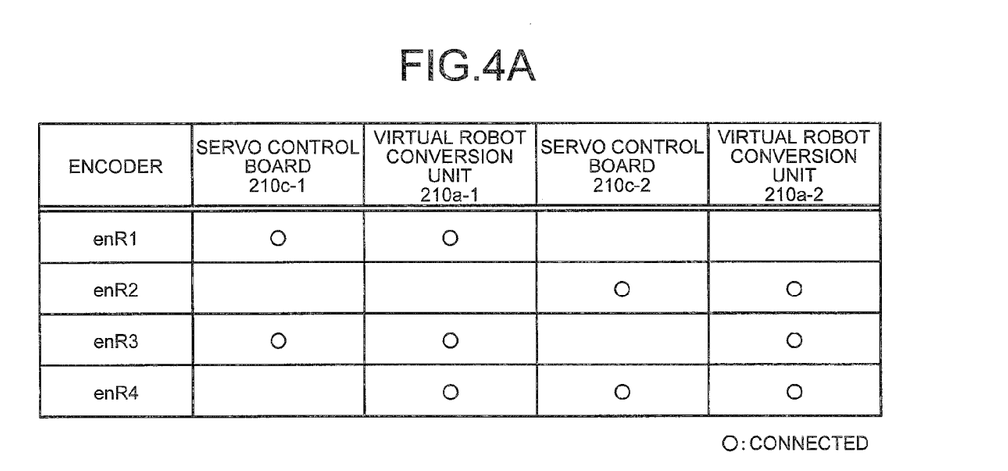
FIG. 4A is a diagram illustrating connection relation of the robot control system according to the embodiment.
Figure 4B:
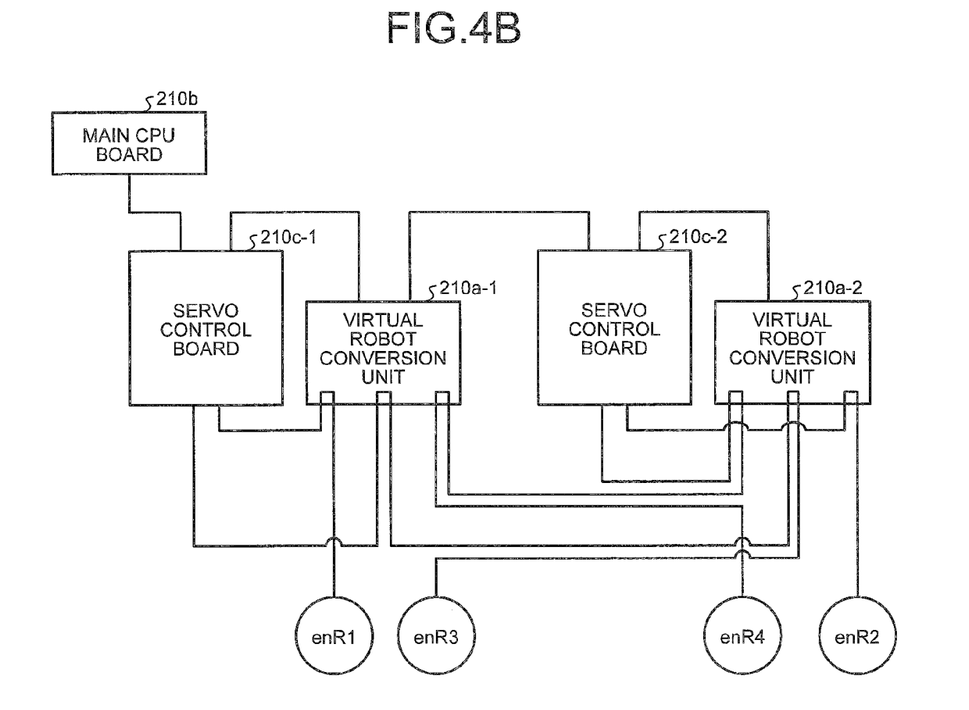
FIG. 4B is a diagram illustrating a connection configuration example of the robot control system according to the embodiment.

Next, a connection configuration of the robot control system 1 according to the embodiment is explained with reference to FIGS. 4A and 4B. FIG. 4A is a diagram illustrating connection relation of the robot control system 1 according to the embodiment. FIG. 4B is a diagram illustrating a connection configuration example of the robot control system 1 according to the embodiment.

A virtual robot conversion unit 210a-1 illustrated in FIGS. 4A and 4B is a component corresponding to the virtual robot converter 21a-1 illustrated in FIG. 3. Moreover, a virtual robot conversion unit 210a-2 is a component corresponding to the virtual robot converter 21a-2 illustrated in FIG. 3.

Similarly, a main CPU board 210b is a component corresponding to the integration unit 21b illustrated in FIG. 3. Moreover, a servo control board 210c-1 and a servo control board 210c-2 are components corresponding to the servo control unit 21c illustrated in FIG. 3.

Herein, it is assumed that the servo control board 210c-1 illustrated in FIGS. 4A and 4B drives the axes of the robot R1 and the robot R3. Moreover, it is assumed that the servo control board 210c-2 drives the axes of the robot R2 and the robot R4.

In this case, as illustrated in FIG. 4A, the encoder enR1 is connected to the servo control board 210c-1 and the virtual robot conversion unit 210a-1 (see "○" symbol of FIG. 4A). Moreover, the encoder enR2 is connected to the servo control board 210c-2 and the virtual robot conversion unit 210a-2.

As illustrated in FIG. 4A, the encoder enR3 is connected to the servo control board 210c-1, the virtual robot conversion unit 210a-1, and the virtual robot conversion unit 210a-2. Moreover, the encoder enR4 is connected to the virtual robot conversion unit 210a-1, the servo control board 210c-2, and the virtual robot conversion unit 210a-2.

In other words, the encoder enR3 of the robot R3 that is an external axis is connected to both the virtual robot conversion unit 210a-1 and the virtual robot conversion unit 210a-2. Similarly, the encoder enR4 of the robot R4 that is an external axis is connected to both the virtual robot conversion unit 210a-1 and the virtual robot conversion unit 210a-2.

In other words, a unit (any of the virtual robot conversion unit 210a-1 and the virtual robot conversion unit 210a-2) that assumes one virtual robot is connected to all the encoders associated with external axes.

A connection configuration example assuming the connection relation illustrated in FIG. 4A is illustrated in FIG. 4B. For example, as illustrated in FIG. 4B, the encoder enR1 is connected to the servo control board 210c-1 via the input and output ports of the virtual robot conversion unit 210a-1.

Similarly, the encoder enR2 is connected to the servo control board 210c-2 via the input and output ports of the virtual robot conversion unit 210a-2.

For example, the encoder enR3 is connected to the servo control board 210c-1 via the virtual robot conversion unit 210a-2 and the virtual robot conversion unit 210a-1 in a row.

Similarly, the encoder enR4 is connected to the servo control board 210c-2 via the virtual robot conversion unit 210a-1 and the virtual robot conversion unit 210a-2 in a row.

The configuration of FIG. 4B is only an example of a connection configuration and thus does not limit an actual connection configuration. Therefore, the configuration of FIG. 4B can be appropriately changed in accordance with a physical specification and the like of each unit of the robot control system 1.

Figure 5:
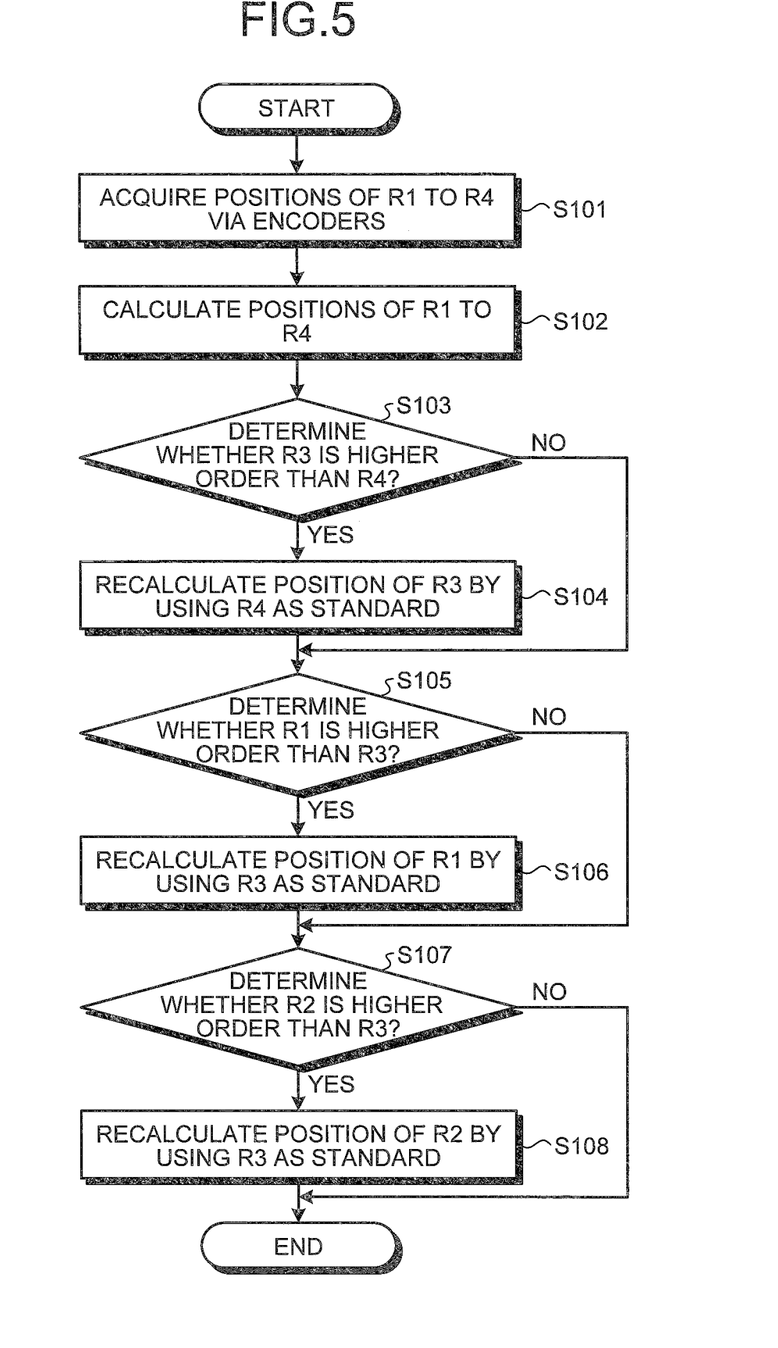
FIG. 5 is a flowchart illustrating a routine that is performed by the robot control system according to the embodiment.

Next, a routine performed by the robot control system 1 according to the embodiment is explained with reference to FIG. 5. FIG. 5 is a flowchart illustrating a routine that is performed by the robot control system 1 according to the embodiment.

A routine of a position computation process performed by the robot control system 1 is illustrated in FIG. 5. The position computation process can be performed by any of the virtual robot converter 21a-1, the virtual robot converter 21a-2, and the integration unit 21b, which are described above.

As illustrated in FIG. 5, the robot control system 1 acquires positions of the robots R1 to R4 via the encoders enR1 to enR4 (Step S101).

Then, the robot control system 1 calculates the positions of the robots R1 to R4 on the basis of acquisition values on the acquired positions of the robots R1 to R4 (Step S102). Herein, the calculation is performed by converting the acquisition values that are output values of the encoders enR1 to enR4 into position values in the respective coordinate systems.

Then, the robot control system 1 determines whether the robot R3 is connected to a higher order than the robot R4 (Step S103). When it is determined that the robot R3 is connected to a high order than the robot R4 (Step S103: Yes), the robot control system 1 recalculates the position of the robot R3 by using the base coordinate system of the robot R4 as a standard (Step S104).

On the other hand, when the determination condition of Step S103 is not satisfied (Step S103: No), the robot control system 1 moves the process control to Step S105.

Next, the robot control system 1 determines whether the robot R1 is connected to a high order than the robot R3 (Step S105). When it is determined that the robot R1 is connected to a high order than the robot R3 (Step S105: Yes), the robot control system 1 recalculates the position of the robot R1 by using the base coordinate system of the robot R3 as a standard (Step S106).

If the position of the robot R3 is already recalculated at Step S104, the recalculation of the position of the robot R1 at Step S106 is consequently performed by using the base coordinate system of the robot R4 as a standard. This point is similarly applied to Step S108 to be described below.

On the other hand, when the determination condition of Step S105 is not satisfied (Step S105: No), the robot control system 1 moves the process control to Step S107.

Next, the robot control system 1 determines whether the robot R2 is connected to a high order than the robot R3 (Step S107). When it is determined that the robot R2 is connected to a high order than the robot R3 (Step S107: Yes), the robot control system 1 recalculates the position of the robot R2 by using the base coordinate system of the robot R3 as a standard (Step S108) and terminates the process.

On the other hand, when the determination condition of Step S107 is not satisfied (Step S107: No), the robot control system 1 terminates the process.

Meanwhile, a two-arm robot that has two multi-axis robots as two arms has been explained till now. However, the configuration of the robot is not limited to this. For example, a multi-axis robot may be a single-axis robot, or a two-arm robot may be a multi-arm robot that has three or more arms.

In other words, the robot control system according to the embodiment can be applied to a plurality of robots connected to each other via external axes.

As described above, the robot control system according to the embodiment includes: a plurality of robots; at least one external axis that is a movable axis shared by the robots; and converters. Each of the converters assumes a virtual robot formed by connecting all external axes to one robot and converts acquisition values on positions of the robot and the external axes acquired for the virtual robot into conversion values indicating absolute positions in a predetermined normal coordinate system.

Therefore, according to the robot control system according to the embodiment, the plurality of robots connected to each other can be easily and certainly controlled.

Although it has been mainly explained that "positions" in a predetermined normal coordinate system of robots and external axes are calculated on the basis of acquisition values acquired via encoders, the embodiment can be further applied to "postures" based on "positions". Herein, the "postures" may be expressed with "directions".

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A robot control system comprising:
   a plurality of robots, each robot having a respective axis;
   at least one external axis that is a movable axis shared by the robots;
   position detectors respectively provided in association with the at least one external axis and the axes of the robots, the position detectors configured to detect positions of the at least one external axis and the axes of the robots; and
   converters of which each assumes a virtual robot formed by connecting all the external axes to a corresponding robot of the robots and converts acquisition values on positions of the corresponding robot and the at least one external axis acquired by the position detectors for the virtual robot into conversion values indicating absolute positions in a predetermined normal coordinate system, wherein
   the converters are separated from each other, and
   each of the converters is connected to the position detectors that are associated with the at least one external axis.

2. The robot control system according to claim 1, wherein each of the converters determines whether the corresponding robot and the at least one external axis are within a predetermined operating area on the basis of the conversion values.

3. The robot control system according to claim 1, wherein each of the converters assumes the corresponding virtual robot, in which the robot is a start end and the at least one external axis are connected to the start end in a row, and employs a base coordinate system, of which a base is an external axis located at a termination end of the row, as the normal coordinate system.

4. The robot control system according to claim 1, wherein the at least one external axis includes at least one of a pivot axis, about which a base rotatably supports a body supporting the robots, and a traveling axis, along which the base the supporting the body travels.

5. The robot control system according to claim 1, wherein each of the robots include a multi-axis robot.

6. The robot control system according to claim 1, wherein each detector provided in association with the at least one external axis is connected to the converters such that a position detector of the plurality of position detectors is first connected to a first converter of the plurality of converters and subsequently connected to a second converter of the plurality of converters.

7. The robot control system according to claim 1, further comprising a memory that stores configuration definition information for the virtual robot, wherein the at least one external axis comprises first and second external axes, and each of the converters determines one or more external axes of the corresponding virtual robot based on the configuration definition information stored in the memory, determines a base coordinate system, of which abase is the external first axis, as the normal coordinate system when the external axis of the corresponding virtual robot is the first external axis, and determines a base coordinate system, of which a base is the second external axis, as the normal coordinate system when the external axes of the corresponding virtual robot are the first and second external axes.

8. A robot control method comprising:

assuming virtual robots of which each includes a robot having a respective axis, and at least one external axis that is a movable axis connected to the robot;

detecting, by a plurality of position detectors provided in association with the at least one external axis and the axes of the robots, positions of the at least one external axis and the axes of the robots;

acquiring, from the plurality of position detectors, values on positions of the robot and the at least one external axis for the virtual robots; and converting, by a plurality of converters which are separated from each other, corresponding values of the acquired values into conversion values indicating absolute positions in a predetermined normal coordinate system.

9. A robot control system comprising:

a plurality of robots, each robot having a respective axis;

at least one external axis that is a movable axis shared by the robots;

a plurality of detecting means for detecting positions of the at least one external axis and the axes of the robots; and a plurality of converting means of which each assumes a virtual robot formed by connecting all the external axes to a corresponding robot of the plurality of robots and converts acquisition values on positions of the corresponding robot and the external axes acquired by the detecting means for the virtual robot into conversion values indicating absolute positions in a predetermined normal coordinate system, wherein respective ones of the converting means separated from each other, and respective ones of the converting means are connected to the detecting means that are associated with the at least one external axis.

* * * * *